(12) United States Patent
Ueno et al.

(10) Patent No.: US 12,173,204 B2
(45) Date of Patent: Dec. 24, 2024

(54) HEAT-SENSITIVE LABEL

(71) Applicant: YUPO CORPORATION, Tokyo (JP)

(72) Inventors: Masahiko Ueno, Ibaraki (JP); Takuya Ikarashi, Ibaraki (JP)

(73) Assignee: YUPO CORPORATION, Tokyo (JP)

(*) Notice: Subject to any disclaimer, the term of this patent is extended or adjusted under 35 U.S.C. 154(b) by 181 days.

(21) Appl. No.: 17/914,034

(22) PCT Filed: Mar. 25, 2021

(86) PCT No.: PCT/JP2021/012658
§ 371 (c)(1),
(2) Date: Sep. 23, 2022

(87) PCT Pub. No.: WO2021/193852
PCT Pub. Date: Sep. 30, 2021

(65) Prior Publication Data
US 2023/0121482 A1    Apr. 20, 2023

(30) Foreign Application Priority Data

Mar. 27, 2020 (JP) .................................. 2020-058941

(51) Int. Cl.
*B32B 27/32* (2006.01)
*B32B 7/02* (2019.01)
(Continued)

(52) U.S. Cl.
CPC .................. *C09J 7/35* (2018.01); *B32B 7/02* (2013.01); *B32B 27/08* (2013.01); *B32B 27/308* (2013.01);
(Continued)

(58) Field of Classification Search
CPC ............ B32B 2250/24; B32B 2307/30; B32B 2307/31; B32B 2307/72; B32B 2519/00;
(Continued)

(56) References Cited

U.S. PATENT DOCUMENTS

| | | |
|---|---|---|
| 2009/0291257 A1 | 11/2009 | Shiina et al. |
| 2013/0008613 A1 | 1/2013 | Henderson |

FOREIGN PATENT DOCUMENTS

| | | |
|---|---|---|
| JP | 2006-309175 A | 11/2006 |
| JP | 2008-292870 A | 12/2008 |

(Continued)

OTHER PUBLICATIONS

ISR issued in International Patent Application No. PCT/JP2021/012658, Jun. 8, 2021, translation.

(Continued)

*Primary Examiner* — Lawrence D Ferguson
(74) *Attorney, Agent, or Firm* — GREENBLUM & BERNSTEIN, P.L.C.

(57) ABSTRACT

A heat-sensitive label that can achieve both sufficient adhesive strength and high recyclability is provided. A heat-sensitive label comprising a substrate layer and a heat sealing layer (A) on the substrate layer, wherein the heat sealing layer (A) comprises a heat sealing resin and a carboxylic anhydride-modified polyolefin resin (h); and a product MCh of an acid value M (mgKOH/g) of the carboxylic anhydride-modified polyolefin resin (h) and a content Ch (% by mass) of the carboxylic anhydride-modified polyolefin resin (h) in the heat sealing layer (A) is 1.5 to 6.0.

18 Claims, 1 Drawing Sheet

(51) Int. Cl.
  *B32B 27/08* (2006.01)
  *B32B 27/30* (2006.01)
  *B32B 27/38* (2006.01)
  *C09J 7/35* (2018.01)

(52) U.S. Cl.
  CPC .............. *B32B 27/32* (2013.01); *B32B 27/38* (2013.01); *B32B 27/306* (2013.01); *B32B 2250/24* (2013.01); *B32B 2307/30* (2013.01); *B32B 2307/31* (2013.01); *B32B 2307/72* (2013.01); *B32B 2519/00* (2013.01); *C09J 2203/334* (2013.01); *C09J 2301/122* (2020.08); *C09J 2301/304* (2020.08); *C09J 2301/414* (2020.08); *C09J 2423/00* (2013.01); *C09J 2433/00* (2013.01); *C09J 2467/008* (2013.01)

(58) Field of Classification Search
  CPC ..... B32B 27/08; B32B 27/306; B32B 27/308; B32B 27/32; B32B 27/38; B32B 7/02; B32B 2250/242; B32B 2307/748; B32B 27/18; C09J 2203/334; C09J 2301/122; C09J 2301/304; C09J 2301/414; C09J 2423/00; C09J 2433/00; C09J 2467/008; C09J 7/35; C09J 2423/04; G09F 3/04; G09F 3/10
  See application file for complete search history.

(56) References Cited

FOREIGN PATENT DOCUMENTS

| | | |
|---|---|---|
| JP | 2009-288419 A | 12/2009 |
| JP | 2011-118102 A | 6/2011 |
| JP | 2016-204588 A | 12/2016 |

OTHER PUBLICATIONS

IPRP issued in International Patent Application No. PCT/JP2021/012658, Sep. 22, 2022, translation.

HEAT-SENSITIVE LABEL

TECHNICAL FIELD

The present invention relates to a heat-sensitive label.

BACKGROUND ART

Conventionally, a plastic container has been used as a container for drinking water, a cosmetic, a seasoning, or the like. A wasted plastic container is being recycled as a new resource in order to reduce the burden on the environment due to the mass consumption of a commercial product.

A label is often attached to a plastic container, and thus the treatment of removing the label from the plastic container is carried out in recycling. For example, in the recycling of a PET bottle, a used PET bottle is cut into small pieces, which are then immersed in boiled alkali water (a 1.5% NaOH aqueous solution) at about 85 to 90° C. in order to peel off the label. A label that can be easily peeled off by this boiled alkali water has also been developed (see, for example, Patent Literature 1).

CITATION LIST

Patent Literature

Patent Literature 1: Japanese Patent Laid-Open No. 2011-118102

SUMMARY OF INVENTION

Technical Problem

However, in order to prevent the label from being peeled off from the plastic container in use, the label is required to have sufficient adhesive strength to the plastic container. As described above, it has been technically difficult to enhance the recyclability by making the label easy to peel off after use while maintaining sufficient adhesive strength in use.

An object of the present invention is to provide a heat-sensitive label that can achieve both sufficient adhesive strength and high recyclability.

Solution to Problem

As a result of diligent studies by the present inventors to solve the above problem, the present inventors have found that the above problem can be solved if a heat sealing layer to be adhered to a resin molded body contains a carboxylic anhydride-modified polyolefin resin in which the acid value and the content satisfy a specific relationship, and completed the present invention.

That is, the present invention is as follows.

(1) A heat-sensitive label comprising a substrate layer and a heat sealing layer (A) on the substrate layer, wherein the heat sealing layer (A) comprises a heat sealing resin and a carboxylic anhydride-modified polyolefin resin (h); and
 a product MCh of an acid value M (mgKOH/g) of the carboxylic anhydride-modified polyolefin resin (h) and a content Ch (% by mass) of the carboxylic anhydride-modified polyolefin resin (h) in the heat sealing layer (A) is 150 to 600.
(2) The heat-sensitive label according to (1), wherein the heat sealing resin has a melting point of 60 to 115° C.
(3) The heat-sensitive label according to (1) or (2), wherein
 the heat sealing layer (A) comprises a tackifier.
(4) The heat-sensitive label according to any one of (1) to (3), wherein
 the heat sealing resin is a resin having an epoxy group or an acetoxy group.
(5) The heat-sensitive label according to any one of (1) to (4), wherein
 the carboxylic anhydride-modified polyolefin resin (h) has a melting point of 60 to 140° C.
(6) The heat-sensitive label according to any one of (1) to (5), wherein
 a weight average molecular weight of the carboxylic anhydride-modified polyolefin resin (h) is 10,000 to 400,000.
(7) A heat-sensitive label comprising a substrate layer and a heat sealing layer (B) on the substrate layer, wherein
 the heat sealing layer (B) comprises a layer (B1) constituting an outermost surface of the heat sealing layer (B), and a layer (B2) provided on a side closer to the substrate layer than the layer (B1);
 the layer (B2) comprises a heat sealing resin and does not comprise a carboxylic anhydride-modified polyolefin resin;
 the layer (B1) comprises a heat sealing resin and a carboxylic anhydride-modified polyolefin resin (s);
 a product MCs of an acid value M (mgKOH/g) of the carboxylic anhydride-modified polyolefin resin (s) and a content Cs (% by mass) of the carboxylic anhydride-modified polyolefin resin (s) in the layer (B1) is 25000 to 90000; and
 the heat sealing resins included in the layer (B1) and the layer (B2) are the same or different.
(8) The heat-sensitive label according to (7), wherein
 the heat sealing resins each have a melting point of 60 to 115° C.
(9) The heat-sensitive label according to (7) or (8), wherein
 the layer (B1) comprises a tackifier.
(10) The heat-sensitive label according to any one of (7) to (9), wherein
 the heat sealing resins are each a low density polyethylene or an ethylene-methacrylic acid copolymer.
(11) The heat-sensitive label according to any one of (7) to (10), wherein
 a thickness of the layer (B1) is 0.5 to 5.0% of a total thickness of the layers (B1) and (B2).
(12) The heat-sensitive label according to any one of (7) to (11), wherein
 a weight average molecular weight of the carboxylic anhydride-modified polyolefin resin (s) is 10,000 to 400,000.
(13) The heat-sensitive label according to any one of (1) to (12), wherein
 a specific gravity of the substrate layer is 1.0 or less.
(14) The heat-sensitive label according to any one of (1) to (13), wherein
 the heat-sensitive label is a label for a molded body of a polyester resin.

Other aspects of the present invention are as follows.
(I) The heat-sensitive label according to any one of (1) to (6), wherein the acid value M of the carboxylic anhydride-modified polyolefin resin (h) is 10 mgKOH/g or more and 40 mgKOH/g or less.
(II) The heat-sensitive label according to any one of (1) to (6), wherein the content Ch of the carboxylic anhydride-modified polyolefin resin (h) is 5% by mass or more and 30% by mass or less.

(III) The heat-sensitive label according to any one of (1) to (6), wherein the acid value M of the carboxylic anhydride-modified polyolefin resin (h) is 10 mgKOH/g or more and 40 mgKOH/g or less, the content Ch thereof is 5% by mass or more and 30% by mass or less, and the product MCh of these is 150 to 600.

(IV) The heat-sensitive label according to any one of (7) to (12), wherein the acid value M of the carboxylic anhydride-modified polyolefin resin (s) is 250 mgKOH/g or more and 900 mgKOH/g or less.

(V) The heat-sensitive label according to any one of (7) to (12), wherein the content Cs of the carboxylic anhydride-modified polyolefin resin (s) is 50% by mass or more and 90% by mass or less.

(VI) The heat-sensitive label according to any one of (7) to (12), wherein the acid value M of the carboxylic anhydride-modified polyolefin resin (s) is 400 mgKOH/g or more and 900 mgKOH/g or less, the content Cs thereof is 50% by mass or more and 80% by mass or less, and the product MCs of these is 25000 to 70000.

Advantageous Effect of Invention

According to the present invention, a heat-sensitive label that can achieve both sufficient adhesive strength and high recyclability can be provided.

DESCRIPTION OF EMBODIMENTS

Hereinafter, the heat-sensitive label of the present invention will be described in detail, but the following description is of an example (representative example) of the present invention, and the present invention is not limited thereto.

In the following description, the description "(meth) acrylic" refers to both acrylic and methacrylic. In addition, in the case of being simply referred to as "heat sealing layer," it refers to both heat sealing layers (A) and (B), and in the case of being simply referred to as "carboxylic anhydride-modified polyolefin resin," it refers to both carboxylic anhydride-modified polyolefin resins (h) and (s).

The heat-sensitive label of the present invention has a substrate layer and a heat sealing layer containing a heat sealing resin on the substrate layer. In the present invention, the heat sealing layer further contains a carboxylic anhydride-modified polyolefin resin, and the product of the acid value (mgKOH/g) thereof and the content (% by mass) thereof in the heat sealing layer is within a specific range.

In the recycling of a resin molded body such as a PET bottle, when a resin molded body to which a heat-sensitive label is attached is immersed in high temperature alkali water (hereinafter, sometimes referred to as high temperature alkali treatment), the carboxylic anhydride-modified polyolefin resin in the heat sealing layer adhered to the resin molded body is neutralized and dissolved by the alkali water, and the label is easily peeled off. This tendency becomes more remarkable as the acid value or the content of the carboxylic anhydride-modified polyolefin resin increases. On the other hand, if the heat sealing layer includes an excessive amount of a carboxylic anhydride-modified polyolefin resin, it tends to be difficult to obtain adhesive strength to the adherend. In particular, the adhesive strength to a stretch blow molded body of PET or the like tends to be weaker than the adhesive strength to a direct blow molded body of polypropylene or the like. However, according to the heat-sensitive label of the present invention in which the product of the acid value and the content is within a specific range as described above, the peelability by high temperature alkali treatment is high, and both excellent recyclability and sufficient adhesive strength to a resin molded body can be achieved. Therefore, it is possible to provide a heat-sensitive label that is difficult to peel off when a resin molded body is used and easy to peel off when the resin molded body is recycled.

The heat sealing layer may be a single layer or a multilayer. The above specific range of the product of the acid value and the content differs depending on whether the heat sealing layer is a single layer or a multilayer.

The heat sealing layer of the heat-sensitive label needs to have a thickness equal to or more than a certain level in order to secure adhesive strength to a resin molded body. The heat sealing layer that is a single layer is preferable in that the production process is simple. However, the layer needs to be relatively thick, and thus the acid value or the content of the carboxylic anhydride-modified polyolefin resin needs to be increased in order to obtain peelability by high temperature alkali treatment. A carboxylic anhydride-modified polyolefin resin having a high acid value often has a high melting point, cannot be expected to contribute to the adhesive strength to a resin molded body, and is difficult to disperse in the layer. Therefore, in the present invention, by using a relatively large amount of a carboxylic anhydride-modified polyolefin resin having a relatively low acid value, both adhesive strength to a resin molded body and peelability by high temperature alkali treatment have been achieved.

On the other hand, a heat sealing layer that is a multilayer is preferable in that it is easy to optimize by functional separation. That is, peelability by high temperature alkali treatment can be secured by containing a carboxylic anhydride-modified polyolefin resin in the outermost layer, and adhesiveness to a resin molded body can be secured by a layer located between the outermost layer and the substrate layer. In this case, by causing the outermost layer to be a relatively thin layer and using a relatively small amount of a carboxylic anhydride-modified polyolefin resin having a high acid value, the desired peelability by high temperature alkali treatment can be obtained without inhibiting the adhesive strength.

Hereinafter, the heat-sensitive label when the heat sealing layer is a single layer and the heat-sensitive label when the heat sealing layer is a multilayer will each be described.

(Single Layer Type Heat-Sensitive Label)

Figure 1:
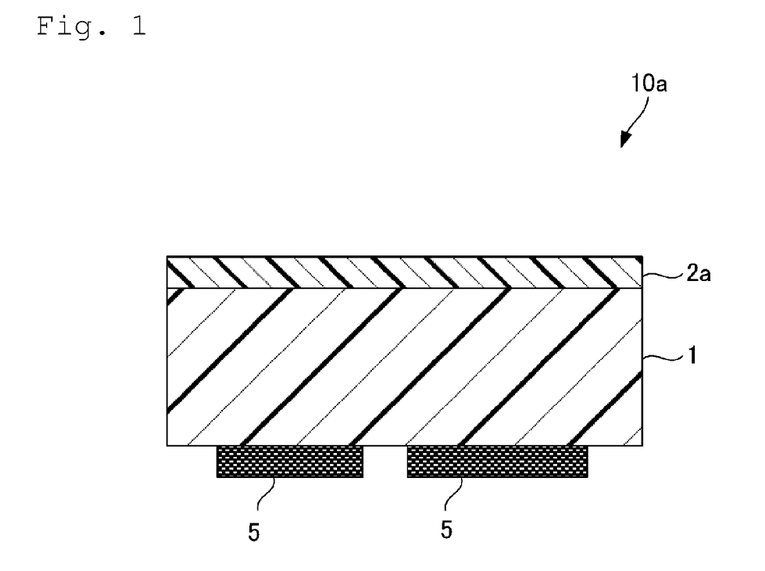
FIG. 1 shows a cross-sectional view illustrating a configuration example of a heat-sensitive label in which the heat sealing layer is a single layer type as one embodiment of the present invention.

FIG. 1 shows a configuration example of a single layer type heat-sensitive label 10a.

The heat-sensitive label 10a given as an example in FIG. 1 has a substrate layer 1 and a heat sealing layer 2a. The heat sealing layer 2a is a heat sealing layer (A) provided on one surface of the substrate layer 1. A printed layer 5 can be provided by printing on the other surface of the substrate layer 1.

<Heat Sealing Layer (A)>

The product MCh ((mgKOH/g)·% by mass) of the acid value M (mgKOH/g) of the carboxylic anhydride-modified polyolefin resin (h) contained in the heat sealing layer (A) and the content Ch (% by mass) of the carboxylic anhydride-modified polyolefin resin (h) in the heat sealing layer (A) is 150 to 600.

When the product MCh is within the range of 150 to 600, it is possible to achieve both excellent recyclability and sufficient adhesive strength to a resin molded body as described above.

From the viewpoint of improving the peelability by high temperature alkali treatment, the product MCh is preferably 180 or more and more preferably 200 or more. From the viewpoint of improving the adhesive strength to a resin molded body, the product MCh is preferably 500 or less and more preferably 300 or less.

<<Carboxylic Anhydride-Modified Polyolefin Resin (h)>>

In the carboxylic anhydride-modified polyolefin resin (h), the polyolefin is modified with a carboxylic anhydride, and the modified moiety is ring-opened by contact with high temperature alkali water to form a carboxy group and is neutralized. By the neutralization, the carboxylic anhydride-modified polyolefin resin is dissolved, or the hydrophilicity is improved and thereby the high temperature alkali water easily enters the adhesive interface, and the heat-sensitive label is easily peeled off from the adherend. When the carboxy group is ring-closed as an anhydride, neutralization by the high temperature alkali water occurs more easily than for a normal carboxy group, and solubility or hydrophilicity is easily obtained. Thereby, a heat-sensitive label that is easily peeled off by contact with high temperature alkali water while obtaining sufficient adhesive strength at the time of ring closure before the contact with the high temperature alkali water can be obtained.

Examples of the polyolefin modified with a carboxylic anhydride include polypropylene and polyethylene. From the viewpoint of interlayer close adhesion to the substrate layer, the polyolefin is preferably polypropylene.

The modification with a carboxylic anhydride may be a modification by copolymerization of an olefin-based monomer and a carboxylic anhydride, or may be a graft modification with a carboxylic anhydride to a side chain of the polyolefin. Examples of the carboxylic anhydride include maleic anhydride.

The weight average molecular weight Mw of the carboxylic anhydride-modified polyolefin resin (h) included in the heat sealing layer (A) of the present invention is preferably 10,000 or more, more preferably 20,000 or more, further preferably 40,000 or more, and particularly preferably 60,000 or more. The weight average molecular weight Mw thereof is preferably 400,000 or less, more preferably 200,000 or less, further preferably 150,000 or less, particularly preferably 120,000 or less, and particularly more preferably 90,000 or less.

When the weight average molecular weight Mw is equal to or more than the above lower limit value, it is easy to suppress the decrease in adhesiveness due to bleeding. In addition, when the weight average molecular weight Mw is equal to or less than the above upper limit value, the adhesive strength is easily enhanced, the solubility in high temperature alkali water is high, and recyclability is easily obtained.

The acid value M of the carboxylic anhydride-modified polyolefin resin (h) included in the heat sealing layer (A) of the present invention is preferably 10 mgKOH/g or more and more preferably 20 mgKOH/g or more. In addition, the acid value M is preferably 40 mgKOH/g or less and more preferably 30 mgKOH/g or less.

When the acid value M is within a relatively small range as described above, the dispersibility of the carboxylic anhydride-modified polyolefin resin (h) in the heat sealing layer (A) is good, and the polyolefin resin (h) often has a low melting point. Because of this, when the heat-sensitive label is adhered to a resin molded body by heating, the carboxylic anhydride-modified polyolefin resin (h) is melted and easily contributes to the improvement of the adhesive strength of the heat sealing layer (A). Therefore, even if the heat sealing layer (A) contains a predetermined amount of the carboxylic anhydride-modified polyolefin (h), the adhesiveness to a resin molded body is not inhibited, and recyclability is easily obtained.

The content Ch of the carboxylic anhydride-modified polyolefin resin (h) in the heat sealing layer (A) may be selected such that the product MCh from the acid value M thereof is within the above specific range. Specifically, from the viewpoint of improving the recyclability, the content Ch is preferably 5% by mass or more and more preferably 7% by mass or more. From the viewpoint of improving the adhesive strength, the content Ch is preferably 30% by mass or less, more preferably 25% by mass or less, and further preferably 15% by mass or less.

That is, in the heat sealing layer (A), preferably, the acid value M of the carboxylic anhydride-modified polyolefin resin (h) is 10 mgKOH/g or more and 40 mgKOH/g or less, the content Ch thereof is 5% by mass or more and 30% by mass or less, and the product MCh of these is in the range of 150 to 600.

The melting point of the carboxylic anhydride-modified polyolefin resin (h) is preferably 60° C. or more, more preferably 70° C. or more, and further preferably 75° C. or more. In addition, the melting point thereof is preferably 140° C. or less, more preferably 120° C. or less, and further preferably 100° C. or less.

When the melting point is equal to or more than the above lower limit value, the development of tackiness of the resin remelted during the high temperature alkali treatment is suppressed, and it is easy to suppress the decrease in recyclability associated therewith. In addition, when the melting point is equal to or less than the above upper limit value, sufficient adhesive strength is easily obtained with a small amount of heat.

<<Heat Sealing Resin>>

The heat sealing resin is one that, when a heat-sensitive label is adhered to a resin molded body, is melted for example by the heat during in-mold molding to enhance the adhesive strength of the label, and is selected from a thermoplastic resin having a low melting point.

The melting point of the heat sealing resin is preferably 60° C. or more, more preferably 70° C. or more, further preferably 75° C. or more, and particularly preferably 80° C. or more. This makes it difficult for labels to block each other. In addition, the melting point is preferably lower than that of the thermoplastic resin used for the substrate layer described later. On the other hand, the melting point of the heat sealing resin is preferably 115° C. or less, more preferably 110° C. or less, further preferably 100° C. or less, and particularly preferably 95° C. or less. Thereby, the heat sealing resin is easily melted during in-mold molding, and the adhesive strength is easily enhanced. When two or more heat sealing resins are used in combination, at least one thereof preferably has a melting point in the above range, and all thereof more preferably each have a melting point in the above range.

The melting point can be measured by a differential scanning calorimeter (DSC: differential scanning calorimetry).

Among such heat sealing resins, an olefin-based resin is preferable because it is excellent in moldability and processability, low cost, transparence, ease of control of flexibility, heat resistance, and chemical resistance.

Examples of the olefin-based resin suitable as the heat sealing resin include a homopolymer and a copolymer of an olefin, and a copolymer formed from an olefin and another comonomer. Specific examples of the olefin include ethylene and propylene. Among these, ethylene is preferable because it is easy to obtain an appropriate crystallinity and it is easy to adjust the heat sealability.

When the heat sealing resin is polyethylene, for example, a low density or medium density polyethylene having a density of 0.900 to 0.940 g/cm$^3$, and a linear low density polyethylene having a density of 0.880 to 0.940 g/cm$^3$ are preferable. Among these, a low density or medium density polyethylene or a linear low density polyethylene having a crystallinity of 10 to 60% as measured by an X-ray method and a number average molecular weight of 10,000 to 40,000 is preferable.

The proportion of the structural unit derived from ethylene in the polyethylene-based resin is preferably 80 mol % or more, more preferably 95 mol % or more, and further preferably 97 mol % or more, from the viewpoint of enhancing the adhesiveness at low temperature. The upper limit of the proportion thereof is less than 100 mol %. On the other hand, from the viewpoint of suppressing blocking, the proportion of the structural unit derived from a monomer copolymerizable with ethylene in the polyethylene-based resin is preferably 5 mol % or less and more preferably 3 mol % or less. The lower limit of the proportion thereof exceeds 0 mol %.

In addition, from the viewpoint of improving the adhesive strength to a molded body, a copolymer formed from ethylene and another comonomer is preferably used as the heat sealing resin.

Examples of the another comonomer used with ethylene include vinyl acetate, acrylic acid, methacrylic acid, an acrylic acid alkyl ester, a methacrylic acid alkyl ester, glycidyl acrylate, and glycidyl methacrylate. Acrylic acid or methacrylic acid may be a salt of a metal such as Zn, Al, Li, K, or Na.

Of these, vinyl acetate, glycidyl methacrylate, or methacrylic acid is preferable because it exhibits adhesive strength to a polyester molded body, particularly heat sealing properties even at low temperature. In addition, from the viewpoint of recyclability due to solubility in high temperature alkali water, the above comonomer preferably has an epoxy group or an acetoxy group. Therefore, the above comonomer is more preferably, for example, vinyl acetate or glycidyl methacrylate. These comonomers may be used singly or in combinations of two or more. That is, the heat sealing resin which is an ethylene copolymer is preferably an ethylene-methacrylic acid copolymer, an ethylene-vinyl acetate copolymer, an ethylene-glycidyl methacrylate copolymer, or an ethylene-glycidyl methacrylate-vinyl acetate copolymer.

The heat sealing layer (A) is a single layer and needs to achieve both adhesive strength to a resin molded body and solubility in high temperature alkali water, and thus the heat sealing resin included in the layer is particularly preferably an ethylene-vinyl acetate copolymer, an ethylene-glycidyl methacrylate copolymer, or an ethylene-glycidyl methacrylate-vinyl acetate copolymer, which has excellent solubility in high temperature alkali water.

The vinyl acetate content of the ethylene-vinyl acetate copolymer and the ethylene-glycidyl methacrylate-vinyl acetate copolymer (JIS K 6924-1:1997) is preferably 5% by mass or more, more preferably 10% by mass or more, and further preferably 15% by mass or more from the viewpoint of adhesiveness and solubility in high temperature alkali water. The vinyl acetate content thereof is preferably 40% by mass or less and more preferably 30% by mass or less from the viewpoint of dispersibility with a carboxylic anhydride-modified polyolefin resin or the like.

The glycidyl methacrylate content of the ethylene-glycidyl methacrylate copolymer and the ethylene-glycidyl methacrylate-vinyl acetate copolymer is preferably 5% by mass or more, more preferably 10% by mass or more, and further preferably 15% by mass or more from the viewpoint of adhesiveness and solubility in high temperature alkali water. The glycidyl methacrylate content thereof is preferably 40% by mass or less and more preferably 30% by mass or less from the viewpoint of dispersibility with a carboxylic anhydride-modified polyolefin resin or the like.

The total content of vinyl acetate and glycidyl methacrylate in the ethylene-glycidyl methacrylate-vinyl acetate copolymer is preferably 5% by mass or more, more preferably 10% by mass or more, and further preferably 15% by mass or more from the viewpoint of adhesiveness and solubility in high temperature alkali water. The total content of the above comonomers is preferably 40% by mass or less and more preferably 30% by mass or less from the viewpoint of dispersibility with a carboxylic anhydride-modified polyolefin resin (h) or the like.

<<Tackifier>>

The heat sealing layer (A) can contain a tackifier. By containing the tackifier, not only high adhesive strength to a molded body of polyethylene, polypropylene, or the like but also high adhesive strength to a molded body of polyester are easily obtained.

Examples of the tackifier include a hydrogenated petroleum resin, an aromatic hydrocarbon resin, and an aliphatic hydrocarbon resin. Examples of the hydrogenated petroleum resin include a partially hydrogenated petroleum resin. Examples of the aromatic hydrocarbon resin include a terpene-based resin, a rosin-based resin, and a styrene-based resin. The rosin-based tackifier is preferable from the viewpoint of improving the adhesive strength, particularly the adhesive strength to a molded body of polyester.

The softening point of the tackifier is preferably 85° C. or more, more preferably 90° C. or more, and further preferably 95° C. or more. The softening point thereof is preferably 110° C. or less and more preferably 105° C. or less. When the softening point is equal to or more than the above lower limit value, the development of tackiness of the resin remelted during the high temperature alkali treatment is suppressed, and it is easy to suppress the decrease in recyclability associated therewith. In addition, when the melting point is equal to or less than the above upper limit value, sufficient adhesive strength is easily obtained with a small amount of heat.

<<Additive>>

The heat sealing layer (A) can include a known additive as long as the heat sealing properties are not greatly impaired. Examples of the additive include a wax and an anti-blocking agent.

Examples of the wax include paraffin wax, microcrystalline wax, carnauba wax, and Fischer-Tropsch wax. The weight average molecular weight Mw of the wax is, for example, 5000 or less. Examples of the anti-blocking agent include an inorganic powder of silica, talc, zeolite, or the like.

The content of such additives in the heat sealing layer (A) is usually 0.01 to 5% by mass independently for each type of additive.

<<Layer Thickness>>

The thickness of the heat sealing layer (A) is preferably 1 μm or more, more preferably 1.5 μm or more, and further preferably 2.0 μm or more. The thickness thereof is preferably 10 μm or less, more preferably 5 μm or less, and further preferably 3 μm or less.

When the thickness is equal to or more than the above lower limit value, the adhesive strength is easily improved. When the thickness is equal to or less than the above upper limit value, it is effective in suppressing the cohesive fracture inside.

The thickness of the heat sealing layer (A) can be measured by observing a cross section using a scanning electron microscope as described in Examples described later.

<Substrate Layer>

The substrate layer can impart mechanical strength to a heat-sensitive label. Thereby, when printing on a heat-sensitive label or when inserting a label into a mold, sufficient elasticity can be obtained, and excellent handleability can be obtained.

<<Thermoplastic Resin>>

The substrate layer contains a thermoplastic resin.

Examples of the thermoplastic resin include an olefin-based resin, an ester-based resin, an amide-based resin, a polyvinyl chloride resin, a polystyrene resin, and a polycarbonate resin. From the viewpoint of mechanical strength, the substrate layer preferably includes an olefin resin or an ester resin and more preferably includes an olefin resin, as the thermoplastic resin.

Examples of the olefin-based resin include a propylene-based resin and an ethylene-based resin. From the viewpoint of moldability and mechanical strength, a propylene-based resin is preferable.

The propylene-based resin is not particularly limited as long as propylene is used as the main monomer. Examples thereof include an isotactic polymer or a syndiotactic polymer obtained by homopolymerizing propylene. In addition, a propylene-α-olefin copolymer, which is a copolymer of propylene as the main component and an α-olefin such as ethylene, 1-butene, 1-pentene, 4-methyl-1-pentene, 1-hexene, 1-heptene, or 1-octene, or the like can also be used. The copolymer may be a copolymer consisting of two monomer components or a multicomponent copolymer consisting of three or more monomers, and may be a random copolymer or a block copolymer. In addition, a propylene homopolymer and a propylene copolymer may be used in combination. Among these, the propylene homopolymer is preferable because it is easy to handle as the main raw material for the substrate layer.

Examples of the ethylene-based resin include a high density polymer having a density of 0.940 to 0.965 g/cm$^3$, a medium density polymer having a density of 0.920 to 0.934 g/cm$^3$, a linear low density polyethylene having a density of 0.900 to 0.920 g/cm$^3$, a copolymer composed mainly of ethylene or the like and obtained by copolymerization with an α-olefin such as propylene, butene, hexene, heptene, octene, or 4-methylpentene-1, an ethylene-acrylic acid copolymer, an ethylene-acrylic acid alkyl ester copolymer, an ethylene-methacrylic acid alkyl ester copolymer, a metal salt (the metal is zinc, aluminum, lithium, sodium, potassium, or the like) of an ethylene-methacrylic acid copolymer, and an ethylene-cyclic olefin copolymer.

Examples of the ester-based resin include a polyethylene terephthalate resin, a polybutylene terephthalate resin, and polyethylene naphthalate.

In addition, examples of the amide-based resin include nylon-6, nylon-6,6, nylon-6,10, and nylon-6,12.

The content of the thermoplastic resin in the substrate layer is preferably 50% by mass or more and more preferably 70% by mass or more. When the content is 50% by mass or more, the mechanical strength of the substrate layer is easily improved. On the other hand, there is no particular upper limit of the content of the thermoplastic resin, which may be 100% by mass or may be less than 100% by mass with the addition of a filler, an additive, and the like described later as long as it does not affect the strength or the moldability.

<<Filler>>

The substrate layer can contain a filler. By containing a filler, a pore is easily formed inside, and the whiteness or the opacity can be enhanced.

Examples of the filler that can be used for the substrate layer include an inorganic filler and an organic filler.

Examples of the inorganic filler include an inorganic particle of heavy calcium carbonate, light calcium carbonate, calcined clay, silica, diatomaceous earth, white clay, talc, a titanium oxide such as rutile type titanium dioxide, barium sulfate, aluminum sulfate, zinc oxide, magnesium oxide, mica, sericite, bentonite, sepiolite, vermiculite, dolomite, wollastonite, glass fiber, or the like. Among these, heavy calcium carbonate, clay, or diatomaceous earth is preferable because it has good moldability of a pore and is inexpensive. The surface of the inorganic filler may be surface-treated using a surface treatment agent such as fatty acid for the purpose of improving the dispersibility or the like.

Examples of the organic filler include an organic particle of polyethylene terephthalate, polyethylene naphthalate, polybutylene terephthalate, polyamide, polycarbonate, polystyrene, a cyclic olefin homopolymer, an ethylene-cyclic olefin copolymer, polyethylene sulfide, polyimide, polymethacrylate, polyether ether ketone, polyphenylene sulfide, a melamine resin, or the like, which is incompatible with an olefin-based resin.

The above inorganic fillers or organic fillers can be used singly or in combinations of two or more.

From the viewpoint of enhancing the whiteness or the opacity of the substrate layer, the content of the filler in the substrate layer is preferably 10% by mass or more and more preferably 15% by mass or more. In addition, from the viewpoint of enhancing the uniformity of molding of the substrate layer, the content of the filler in the substrate layer is preferably 70% by mass or less, more preferably 60% by mass or less, and further preferably 50% by mass or less. On the other hand, from the viewpoint of enhancing the transparency of the substrate layer, the content of the filler in the substrate layer may be less than 10% by mass or 0% by mass.

The average particle size of the inorganic filler or the organic filler is preferably 0.01 μm or more, more preferably 0.05 μm or more, and further preferably 0.1 μm or more, from the viewpoint of easiness of forming a pore. From the viewpoint of imparting mechanical strength such as tear resistance, the average particle size of the inorganic filler or the organic filler is preferably 15 μm or less, more preferably 5 μm or less, and further preferably 2 μm or less.

The average particle size of the inorganic filler is the volume average particle size (50% cumulative particle size) D50, which corresponds to 50% of the cumulative volume as measured using a particle measurement apparatus, for example, a laser diffraction particle size distribution analyzer (Microtrac, manufactured by Nikkiso Co., Ltd.). In addition, the average particle size of the organic filler is the average dispersed particle size when dispersed in a thermoplastic resin by melt-kneading and dispersion. The average dispersed particle size can be determined as an average value obtained by observing a cut surface of a thermoplastic resin film containing an organic filler using an electron microscope and measuring and averaging the maximum sizes of at least 10 particles.

<<Porosity>>

When the substrate layer has a pore inside, the porosity, which represents the proportion of a pore in a layer, is preferably 10% or more, more preferably 20% or more, and further preferably 30% or more from the viewpoint of obtaining opaqueness. From the viewpoint of maintaining the mechanical strength, the porosity is preferably 70% or less, more preferably 55% or less, and further preferably 40% or less. On the other hand, from the viewpoint of enhancing the transparency of the substrate layer, the porosity may be less than 10% or 0%.

The porosity can be determined from the proportion of the area occupied by the pore in a certain region of a cross section of a sample observed using an electron microscope.

Usually, the higher the filler content, the higher the porosity, and the higher the whiteness or the opacity of the substrate layer. The filler content or the porosity can be selected according to the transparence, whiteness, or the like required for the heat-sensitive label.

The substrate layer can contain a component such as an antioxidant such as a sterically hindered phenol-based one, a phosphorus-based one, an amine-based one, or a sulfur-based one; a light stabilizer such as a sterically hindered amine-based one, a benzotriazole-based one, or a benzophenone-based one; a dispersant, or an antistatic agent, depending on the required physical property. When the substrate layer contains such components, the content of each component is preferably 0.001 to 1% by mass based on the total mass of the components constituting the substrate layer.

<<Specific Gravity>>

The specific gravity of the substrate layer is preferably 1.0 or less. Thereby, the heat-sensitive label peeled off from a molded body when immersed in alkali water in high temperature alkali treatment easily rises. The specific gravity of the resin of a molded body generally exceeds 1.0, and thus the molded body and the heat-sensitive label are easily separated from each other, and the label is easily removed.

From the viewpoint of layer strength, the thickness of the substrate layer is preferably 20 μm or more and more preferably 40 μm or more. From the viewpoint of reducing the weight of the heat-sensitive label, the thickness of the substrate layer is preferably 200 μm or less and more preferably 150 μm or less.

The surface of the substrate layer opposite to the heat sealing layer may be surface-treated from the viewpoint of enhancing the close adhesion to the printed layer. In addition, a print receiving layer or the like having high close adhesion to the printed layer may be provided on the surface of the substrate layer opposite to the heat sealing layer.

(Multilayer Type Heat-Sensitive Label)

<Heat Sealing Layer (B)>

The heat sealing layer (B) having a multilayer structure has a layer (B1) constituting the outermost surface of the heat sealing layer and a layer (B2) provided on the side closer to the substrate layer than the layer (B1).

Figure 2:
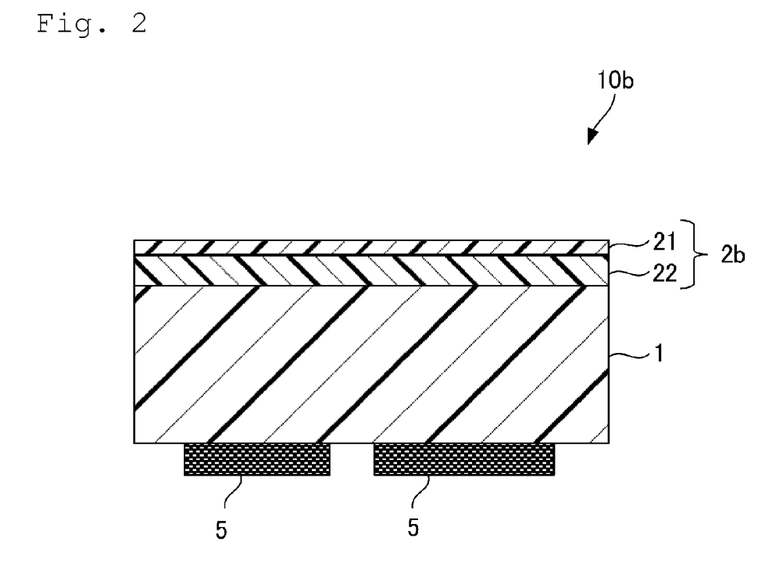
FIG. 2 shows a cross-sectional view illustrating a configuration example of a heat-sensitive label in which the heat sealing layer is a multilayer type as one embodiment of the present invention.

FIG. 2 shows a configuration example of a multilayer type heat-sensitive label 10b.

The heat-sensitive label 10b given as an example in FIG. 2 has a substrate layer 1 and a heat sealing layer 2b. The heat sealing layer 2b is a heat sealing layer (B) and has a layer 21 and a layer 22. The layer 21 is a layer (B1) constituting the outermost surface of the heat-sensitive label 10b. The layer 22 is a layer (B2) disposed between the layer 21 and the substrate layer 1. A printed layer 5 can be provided by printing on the surface of the substrate layer 1 opposite to the heat sealing layer 2b.

In the heat sealing layer (B), the layer (B1) contains a carboxylic anhydride-modified polyolefin resin (s). In addition, the product MCs ((MgKOH/g)·% by mass) of the acid value M (mgKOH/g) of the carboxylic anhydride-modified polyolefin resin (s) and the content Cs (% by mass) of the carboxylic anhydride-modified polyolefin resin (s) in the layer (B1) is 25000 to 90000.

When the product MCs is within the range of 25000 to 90000, as in the case of the single layer type described above, both excellent recyclability due to high peelability during high temperature alkali treatment and sufficient adhesive strength to a resin molded body can be achieved.

From the viewpoint of improving the peelability by high temperature alkali treatment, the product MCs is preferably 30000 or more and more preferably 35000 or more. From the viewpoint of improving the adhesive strength to a resin molded body, the product MCs is preferably 90000 or less, more preferably 80000 or less, further preferably 70000 or less, and particularly preferably 60000 or less.

<<Layer (B1)>>

The layer (B1) contains a carboxylic anhydride-modified polyolefin resin (s). The layer (B1) is a coat layer provided on the layer (B2) by coating.

<<<Carboxylic Anhydride-Modified Polyolefin Resin (s)>>>

As the carboxylic anhydride-modified polyolefin resin (s), the same ones as listed as <<Carboxylic anhydride-modified polyolefin resin (h)>> in the <Heat sealing layer (A)> section described above can be used.

The acid value M of the carboxylic anhydride-modified polyolefin resin (s) used for the layer (B1) is preferably 250 mgKOH/g or more, more preferably 400 mgKOH/g or more, and further preferably 500 mgKOH/g or more. The acid value M thereof is preferably 900 mgKOH/g or less, more preferably 850 mgKOH/g or less, and further preferably 800 mgKOH/g or less.

When the acid value M is within a relatively large range as described above, the carboxylic anhydride-modified polyolefin resin has extremely high solubility in high temperature alkali water. Therefore, the layer (B1) may include a carboxylic anhydride-modified polyolefin resin such that the MCs satisfies the above range, and when a relatively small amount of the carboxylic anhydride-modified polyolefin resin is used based on the entire heat sealing layer (B), it is possible to obtain sufficient solubility to peel off the label when immersed in to high temperature alkali water. In addition, the layer (B1) is a relatively thin layer as described later, and thus the concentration of the carboxylic anhydride-modified polyolefin dispersed in the layer (B1) near the surface of the heat sealing layer (B) becomes high. Therefore, the carboxylic anhydride-modified polyolefin included in the layer (B1) can effectively exhibit peelability by high temperature alkali treatment even in a small amount.

On the other hand, the carboxylic anhydride-modified polyolefin resin (s) having a high acid value in the above range usually has no melting point or has an extremely high melting point. Because of this, when the heat-sensitive label is adhered to a resin molded body by heating, the carboxylic anhydride-modified polyolefin resin (s) is difficult to melt and remains solid in the heat sealing layer (B1). Because of this, it is difficult to contribute to the improvement of the adhesive strength, but as described above, the content thereof based on the entire heat sealing layer (B) is relatively low, and thus recyclability is easily obtained without inhibiting the adhesiveness to a resin molded body.

The content Cs of the carboxylic anhydride-modified polyolefin resin (s) in the layer (B1) can be selected such that the product MCs from the acid value M thereof is within the above specific range. Specifically, from the viewpoint of improving the recyclability, the content Cs is preferably 50% by mass or more and more preferably 60% by mass or more. From the viewpoint of improving the adhesive strength, the content Cs is preferably 90% by mass or less, more preferably 85% by mass or less, further preferably 80% by mass or less, and particularly preferably 70% by mass or less.

Among these, as the layer (B1), preferably, the acid value M of the carboxylic anhydride-modified polyolefin resin (s) is 400 mgKOH/g or more and 900 mgKOH/g or less, the content Cs thereof is 50% by mass or more and 80% by mass or less, and the product MCs of these is 25000 to 70000.

In addition, the content Cs of the carboxylic anhydride-modified polyolefin resin (s) in the entire heat sealing layer (B) is preferably 1.0% by mass or more and more preferably 1.4% by mass or more from the viewpoint of improving the recyclability, whereas from the viewpoint of improving the adhesive strength, the content Cs is preferably 2.2% by mass or less and more preferably 1.8% by mass or less.

The carboxylic anhydride-modified polyolefin resin (s) used for the layer (B1) has a relatively large acid value M as described above, and thus the resin usually has no melting point or if the resin has a melting point, the melting point is usually 170° C. or more, preferably 200° C. or more, and more preferably 230° C. or more.

The weight average molecular weight Mw of the carboxylic anhydride-modified polyolefin resin (s) used for the layer (B1) is preferably 10,000 or more and more preferably 30,000 or more. The weight average molecular weight Mw thereof is preferably 400,000 or less.

When the weight average molecular weight Mw is equal to or more than the above lower limit value, it is easy to suppress the decrease in adhesiveness due to bleeding. In addition, when the weight average molecular weight Mw is equal to or less than the above upper limit value, high adhesive strength to a molded body is easily obtained.

<<Heat Sealing Resin>>

The layer (B1) contains a heat sealing resin.

Examples of the heat sealing resin include the same resins as listed as <<Heat sealing resin>> in the "Heat sealing layer (A)."

Ones preferable as the heat sealing resin are also the same as described above, and the heat sealing resin included in the layer (B1) is particularly preferably an ethylene-methacrylic acid copolymer in that the melting point and viscosity are low and the adhesive strength to the adherend is high at the time of heat sealing.

The content of the heat sealing resin in the layer (B1) may be determined such that the content of the carboxylic anhydride-modified polyolefin resin (s) satisfies the above range.

<<Tackifier>>

The layer (B1) preferably contains a tackifier from the viewpoint of aiding the adhesive strength of the heat sealing layer (B). As the tackifier, a (meth)acrylic acid-based copolymer can be used in addition to the same tackifier as for the single layer heat sealing layer (A) described above. In particular, when an ethylene-methacrylic acid copolymer is used as the heat sealing resin, it is preferable to use a (meth)acrylic acid-based copolymer as the tackifier.

The (meth)acrylic acid-based copolymer used as the tackifier preferably has a polar group. The (meth)acrylic acid-based copolymer may be anionic, cationic, or amphoteric, and from the viewpoint of the adhesiveness of the layer (B1), the (meth)acrylic acid-based copolymer is a (meth) acrylic acid-based copolymer having a cationic group and more preferably a (meth)acrylic acid ester-based copolymer having a water-soluble cationic group. If the (meth)acrylic acid-based copolymer is water-soluble, the layer (B1) can be easily formed by preparing a coating liquid using an aqueous solvent and applying the coating liquid. Among (meth) acrylic acid ester-based copolymers having a cationic group, a (meth)acrylic acid ester-based copolymer having a tertiary ammonium salt structure is preferable from the viewpoint of adhesiveness.

The content of the tackifier in the layer (B1) is usually about 0.3 to 5% by mass and preferably about 0.5 to 3% by mass.

<<<Antistatic Agent>>>

The layer (B1) may contain an antistatic agent from the viewpoint of reducing the attachment of dust due to charging and poor conveyance during printing.

As the antistatic agent, a polymer type antistatic agent is preferable from the viewpoint of reducing surface contamination or the like due to bleed-out. The polymer type antistatic agent is not particularly limited, and a cationic type, anionic type, amphoteric type, or nonionic type antistatic agent can be used. These can be used singly or in combinations of two or more.

The content of the antistatic agent in the layer (B1) is preferably 0.01% parts by mass or more, more preferably 1% by mass or more, and further preferably 2% by mass or more from the viewpoint of prevention of static charge buildup. From the viewpoint of water resistance, the content of the antistatic agent in the layer (B1) is preferably 85% by mass or less, more preferably 75% by mass or less, and further preferably 70% by mass or less.

<<Additive>>

As can the heat sealing layer (A) described above, the layer (B1) can also include a known additive as long as the advantageous effect of the invention is not impaired. Examples of the additive include an anti-blocking agent and a cross-linking agent. Examples of the cross-linking agent include a bifunctional or higher functional substance having a hydroxy (hydroxyl) group, a carboxy group, an epoxy group, an isocyanate group, an aldehyde group, an oxazoline skeleton, a carbodiimide skeleton, or the like as a reactive functional group.

The content of such additives in the layer (B1) is usually 0.01 to 5% by mass independently for each type of additive.

<<Layer Thickness>>

The thickness of the layer (B1) can be expressed as the mass per unit area of the layer (B1). The thickness of the layer (B1) is preferably 0.01 g/m$^2$ or more and more preferably 0.03 g/m$^2$ or more from the viewpoint of recyclability. In addition, the thickness of the layer (B1) is preferably 5 g/m$^2$ or less, more preferably 1 g/m$^2$ or less, and further preferably 0.5 g/m$^2$ or less from the viewpoint of adhesive strength.

If the above mass range is converted into a thickness, the thickness of the layer (B1) is preferably 0.01 μm or more and more preferably 0.03 μm or more from the viewpoint of recyclability. In addition, the thickness of the layer (B1) is preferably 5 μm or less, more preferably 1 μm or less, and further preferably 0.5 μm or less from the viewpoint of adhesive strength.

In addition, the thickness of the layer (B1) based on the total thickness of the layer (B1) and the layer (B2) described later is preferably 0.5% or more and more preferably 1.5% or more from the viewpoint of adhesive strength, whereas from the viewpoint of suppressing blocking, the thickness of the layer (B1) is preferably 5.0% or less and more preferably 3.5% or less.

<<Layer (B2)>>

In the heat sealing layer (B), the layer (B1) secures the peelability by high temperature alkali treatment, and the layer (B2) mainly secures the adhesiveness to a resin molded body.

The layer (B2) contains a heat sealing resin, but does not contain a carboxylic anhydride-modified polyolefin resin.

<<<Heat Sealing Resin >>>

Examples of the heat sealing resin that can be used for the layer (B2) include the same resins as listed as <<Heat sealing resin>> in the "Heat sealing layer (A)."

Ones preferable as the heat sealing resin are also the same as described above, and the heat sealing resin included in the layer (B2) is particularly preferably polyethylene in that a burn mark, that is, a black burned substance generated on the surface of a molded article, during molding is unlikely to occur. Specifically, a low density or medium density polyethylene having a density of 0.900 to 0.940 g/cm$^3$ and a linear low density polyethylene having a density of 0.880 to 0.940 g/cm$^3$ are preferable, and among these, a polyethylene-based resin such as a low density or medium density polyethylene and a linear low density polyethylene having a crystallinity of 10 to 60% as measured by an X-ray method and a number average molecular weight of 10,000 to 40,000 is preferable.

The heat sealing resin included in the layer (B2) may be the same as or different from that in the layer (B1).

<<<Additive>>>

As can the heat sealing layer (A) described above, the layer (B2) can include a known additive as long as the advantageous effect of the invention is not impaired. Examples of the additive include a wax and an anti-blocking agent. The content of such additives in the layer (B2) is usually 0.01 to 5% by mass independently for each type of additive.

<<Layer Thickness>>

The thickness of the layer (B2) is preferably 1 μm or more and more preferably 2 μm or more from the viewpoint of obtaining sufficient adhesiveness. From the viewpoint of suppressing the cohesive fracture inside the heat sealing layer (B), the thickness of the layer (B2) is preferably 5 μm or less and more preferably 3 μm or less.

<Substrate Layer>

The substrate layer of a multilayer type heat-sensitive label can be the same layer as the substrate layer of a single layer type heat-sensitive label.

(Method for Producing Single Layer Type Heat-Sensitive Label)

The single layer type heat-sensitive label can be produced, for example, by laminating the heat sealing layer (A) on one surface of the substrate layer.

<Film Forming>

Examples of the method for forming the substrate include a film forming method such as extrusion (casting) using a T die, inflation molding using an 0 die, and calendering using a calender roll.

Examples of the method for laminating the heat sealing layer (A) on the substrate layer include a coextrusion method, an extrusion lamination method, a coating method, and a film bonding method.

In the coextrusion method, a resin composition for a substrate layer and a resin composition for a heat sealing layer (A) are supplied to a multilayer die, and the resin compositions are laminated in the multilayer die and extruded. According to the coextrusion method, laminating is carried out in parallel with film forming.

In the extrusion lamination method, the substrate layer is first molded, the molten resin composition for a heat sealing layer (A) is laminated thereon, and the resulting laminated body is nipped using a roll while being cooled. According to the extrusion lamination method, film forming and laminating are carried out in separate steps.

In the film bonding method, the substrate layer and the heat sealing layer (A) are each formed into a film, and the both are bonded via a pressure-sensitive adhesive. According to the film bonding method, film forming and laminating are carried out in separate steps.

<Stretching>

The substrate layer and the heat sealing layer (A) may each be an unstretched film or a stretched film.

Examples of the stretching method include a longitudinal stretching method using difference in peripheral speed of a roll group, a transverse stretching method using a tenter oven, a sequential biaxial stretching method combining these, a rolling method, a simultaneous biaxial stretching method using a combination of a tenter oven and a pantograph, and a simultaneous biaxial stretching method using a combination of a tenter oven and a linear motor. In addition, a simultaneous biaxial stretching (inflation molding) method in which a molten resin is extruded into a tube shape using a circular die connected to a screw type extruder and then air is blown into the molten resin extruded, or the like can also be used.

The substrate layer and the heat sealing layer (A) may be individually stretched before each layer is laminated, or may be stretched together after laminating. In addition, the stretched layer may be stretched again after laminating.

When the thermoplastic resin used for each layer is an amorphous resin, the stretching temperature at the time of carrying out stretching is preferably in the range of the glass transition point of the thermoplastic resin or higher. In addition, when the thermoplastic resin is a crystalline resin, the stretching temperature is preferably within the range of the glass transition point of an amorphous portion of the thermoplastic resin or higher and the melting point of a crystalline portion of the thermoplastic resin or lower, and specifically, a temperature 2 to 60° C. lower than the melting point of the thermoplastic resin is preferable.

The stretching speed is not particularly limited, and is preferably within the range of 20 to 350 m/min from the viewpoint of stable stretching and molding.

In addition, the stretch ratio can also be appropriately determined in consideration of the properties of the thermoplastic resin used and the like. For example, when a thermoplastic resin film including a homopolymer of propylene or a copolymer thereof is stretched in one direction, the stretch ratio is usually about 1.2 times or more and preferably 2 times or more, and usually 12 times or less and preferably 10 times or less. In addition, the stretch ratio in the case of biaxial stretching, which is the area stretch ratio, is usually 1.5 times or more and preferably 10 times or more, and usually 60 times or less and preferably 50 times or less.

Within the above range of the stretch ratio, the target porosity can be obtained and the opacity is easily improved. In addition, the film is unlikely to break and tends to be able to be stably stretched and molded.

<Surface Treatment>

In order to enhance the close adhesion to an adjacent layer, the surface of the substrate layer or the heat sealing layer (A) is preferably activated by a surface treatment.

Examples of the surface treatment include corona discharge treatment, frame treatment, plasma treatment, glow discharge treatment, and ozone treatment, and these treatments can be combined. Among these, corona discharge treatment or frame treatment is preferable, and corona discharge treatment is more preferable.

The amount of discharge when the corona discharge treatment is carried out is preferably 600 $J/m^2$ (10 $W·min/m^2$) or more and more preferably 1,200 $J/m^2$ (20 $W·min/m^2$) or more. In addition, the amount of discharge is preferably 12,000 $J/m^2$ (200 $W·min/m^2$) or less and more preferably 10,800 $J/m^2$ (180 $W·min/m^2$) or less. The amount of discharge when the frame treatment is carried out is preferably 8,000 $J/m^2$ or more and more preferably 20,000 $J/m^2$ or more, and the amount of discharge is preferably 200,000 $J/m^2$ or less and more preferably 100,000 $J/m^2$ or less.

(Method for Producing Multilayer type Heat-Sensitive Label)

As can the single layer type heat-sensitive label, the multilayer type heat-sensitive label can be produced by carrying out film forming and stretching (and if necessary, a surface treatment) to obtain a laminated body having a layer (B2) provided on a substrate layer and then providing a layer (B1) on the layer (B2).

Examples of the method for providing a layer (B2) on a substrate layer include the same method as the method for forming a heat sealing layer (A) on a substrate layer in the single layer type heat-sensitive label described above. The substrate layer and the heat sealing layer (B2) may each be an unstretched film or a stretched film. In addition, the surface may be activated by a surface treatment.

A layer (B1) is provided on the layer (B2). The layer (B1) may be provided by the same method as the method for providing a layer (B2) on a substrate layer, and from the viewpoint of thin film formability, the layer (B1) is preferably formed by a coating method using a coating liquid for forming a layer (B1).

Examples of the coating method include printing and coating, and if necessary, drying may be carried out after coating. The coating liquid can be prepared by dissolving or dispersing each component of the layer (B1) in a solvent. When a constituent component is water-soluble, a water-soluble coating liquid can be prepared using an aqueous solvent. It is preferable to use a water-soluble coating liquid from the viewpoint of ease of process control and safety as well. The aqueous solvent contains water as the main component and may contain a water-soluble organic solvent such as methyl alcohol, ethyl alcohol, isopropyl alcohol, acetone, methyl ethyl ketone, ethyl acetate, toluene, and xylene. The term "contain water as the main component" means that 50% by mass or more of the entire solvent is water.

The coating with the coating liquid and the drying of the coating film may be carried out in a step (in-line) continuous with the molding of the substrate layer and the layer (B2), or may be carried out offline. The coating mass of the coating liquid can be appropriately adjusted in consideration of the thickness of the layer (B1) after drying, the concentration of the contained component, and the like. For coating, a coating apparatus such as a die coater, a bar coater, a roll coater, a lip coater, a gravure coater, a spray coater, a blade coater, a reverse coater, and an air knife coater can be used. For drying, a drying apparatus such as a hot air blower and an infrared dryer can be used.

<Formation of Printed Layer>

A printed layer can be provided by printing on the surface of the heat-sensitive label opposite to the heat sealing layer (A) or (B). Examples of the print information include display of a commercial product such as a commercial product name or a logo, a manufacturer, a sales company name, a usage method, and a barcode.

Examples of the printing method include gravure printing, offset printing, flexographic printing, sticker printing, and screen printing.

<Label Processing>

The heat-sensitive label of the present invention can be processed into a required shape and size by cutting or punching a laminated film having a substrate layer and a heat sealing layer (A) or (B) obtained in the above steps. The cutting or punching can be carried out before printing, and is preferably carried out after printing from the viewpoint of ease of work.

(Labeled Molded Body)

By providing the heat-sensitive label of the present invention on a resin molded body such as a resin container, a labeled molded body can be obtained. The method for attaching the heat-sensitive label of the present invention to a resin molded body is not particularly limited, and the heat-sensitive label of the present invention is particularly suitable for in-mold molding of the resin molded body.

When the heat-sensitive label of the present invention is used for in-mold molding, for example, the label is disposed on the inner surface of the lower female mold, which is a differential pressure molding mold, such that the printed surface of the label is in contact with the inner surface of the mold, and then fixed onto the inner wall of the mold by suction. Next, the melt of a resin sheet for a molded article molding material is guided above the lower female mold, and is subjected to differential pressure molding by a conventional method to form a label-bonded molded body in which the label is integrally fused to the outer wall of the molded article. Both vacuum forming and compressed air forming can be adopted for the differential pressure forming, and in general, the differential pressure forming in which the both are used in combination and a plug assist is used is preferable.

In addition, the heat-sensitive label of the present invention can be suitably used for direct blow molding in which a molten resin parison is pressed against the inner wall of a mold by compressed air, stretch blow molding using a preform, or injection molding in which a molten resin is injected into a mold using an injection apparatus and cooled and solidified.

Above these, the heat-sensitive label of the present invention is suitable for direct blow molding or injection molding.

In the resin molded body to which the label thus produced is attached and integrated, the label and the resin molded body are integrally molded after the label is fixed in the mold. Because of this, a molded body having a good appearance which is decorated with the label and in which there is no deformation of the label, the adhesive strength between the molded body and the label is strong, and there is no blister can be obtained. Examples of the resin molded body include a bottle and a container.

Table 1 shows a list of materials used in the production of the heat-sensitive labels of Examples and Comparative Examples.

TABLE 1

| Type | | Symbol | Description |
|---|---|---|---|
| Thermoplastic resin | | MA | Propylene homopolymer (trade name: NOVATEC PP MA4, manufactured by Japan Polypropylene Corporation, melting point (JIS-K7121): 167° C.) |
| Heat sealing (HS) resin | EVA | 631 | Ethylene (E)-vinyl acetate (VA) copolymer (trade name: Ultrasen 631, manufactured by Tosoh Corporation, E: 80% by mass, VA: 20% by mass, melting point: 82° C.) |
| | BF | | Ethylene (E)-glycidyl methacrylate (GMA)-vinyl acetate (VA) copolymer (trade name: Bondfast BF-2B, manufactured by Sumitomo Chemical Company, Limited, E: 83% by mass, GMA: 12% by mass, VA: 5% by mass, melting point: 95° C.) |
| | PE | KS | Metallocene-based low density polyethylene (trade name: KERNEL KS571, manufactured by Japan Polyethylene Corporation, melting point: 100° C., density (ASTMD-1505) 0.907 g/cm$^3$, MFR (ASTMD-1238, 190° C., load of 2.16 kg): 12 g/10 min) |
| | EMAA | EMAA | Ethylene-methacrylic acid copolymer (trade name: NUCREL N035C, manufactured by Dow-Mitsui Polychemicals Co., Ltd., melting point: 86° C.) |
| Carboxylic anhydride-modified polyolefin resin (acid-modified PO) | | KE | Maleic anhydride-modified polypropylene resin (trade name: TOYO TAC PMA-KE, manufactured by Toyobo Co., Ltd., melting point: 80° C., Mw: about 60,000, acid value: 24 mgKOH/g) |
| | | ISO | Isobutylene-maleic anhydride copolymer (trade name: ISOBAM 04, manufactured by Kuraray Co., Ltd., no melting point, Mw: about 60,000, acid value: 726 mgKOH/g) |
| Tackifier | | YS | Terpene resin (trade name: YS RESIN PX1000, manufactured by Yasuhara Chemical Co., Ltd., softening point: 100° C.) |
| | | Ac | Methacrylic acid-based copolymer (Mw: 40,000) |

<Resin Molded Body>

The material of the resin molded body for which the heat-sensitive label of the present invention can be used is not particularly limited, and can be used for a resin container of, for example, a polyethylene resin, a polypropylene resin, or a polyethylene terephthalate (PET) resin. The heat-sensitive label of the present invention has a heat sealing layer containing a carboxylic anhydride-modified polyolefin resin on the surface, and thus has excellent adhesion to a polar resin and can be preferably used as a label for a molded body of a polyester resin such as polyethylene terephthalate, polybutylene terephthalate, polybutylene succinate, and polylactic acid. In addition, examples of the molded body of the polar resin that can be used include, because it has the same adhesive mechanism as the ester-based resin, a molded body of a polycarbonate resin, an acrylonitrile-styrene (AS) resin, an acrylonitrile-butadiene-styrene (ABS) resin, a methyl methacrylate-styrene (MS) resin, or the like.

The color of the resin molded body may be transparent, or may be a natural color including no coloring material such as a pigment or a dye, or may be an opaque color due to a coloring material or coloring.

When the resin molded body is a container, the cross-sectional shape of the body of the container may be a perfect circle, an ellipse, or a rectangle. When the cross-sectional shape of the body is a rectangle, the corners preferably have a curvature. From the viewpoint of strength, the cross section of the body is preferably a perfect circle or an ellipse close to a perfect circle, and more preferably a perfect circle.

EXAMPLES

Hereinafter, the present invention will be described further specifically with reference to Examples, but the present invention is not limited to the following Examples. A description of "parts," "%," or the like in the Examples means a description on a mass basis unless otherwise specified.

Preparation Example 1: Preparation of Tackifier (Ac))

40 kg of isopropanol (manufactured by Tokuyama Corporation, product name: TOKUSO IPA) was placed in a reactor having an internal volume of 150 L equipped with a reflux condenser, a nitrogen introduction tube, a stirrer, a thermometer, a dropping funnel, and a heating jacket. While stirring this, 12.6 kg of N,N-dimethylaminoethyl methacrylate (manufactured by Sanyo Chemical Industries, Ltd., product name: Methacrylate DMA), 12.6 kg of butyl methacrylate (manufactured by Mitsubishi Rayon Co., Ltd., product name: Acryester B), and 2.8 kg of a higher alcohol methacrylic acid ester (manufactured by Mitsubishi Rayon Co., Ltd., product name: Acryester SL, a mixture of lauryl methacrylate and tridecyl methacrylate) were introduced into the reactor. Next, nitrogen purge inside the system was carried out, the temperature in the reactor was raised to 80° C., and then 0.3 kg of 2,2'-azobisisobutyronitrile (manufactured by Wako Pure Chemical Industries, Ltd., product name: V-60 (AIBN)) as a polymerization initiator was introduced into the reactor.

The copolymerization reaction was carried out by continuing stirring for 4 hours while keeping the temperature in the reactor at 80° C. After cooling to room temperature, 4.3 kg of glacial acetic acid (manufactured by Wako Pure Chemical Industries, Ltd.) was introduced into the reactor to neutralize the resulting copolymer. Next, while introducing 48.3 kg of ion exchanged water into the reactor, isopropanol was distilled off to replace the system with an aqueous system to obtain a viscous aqueous solution (solid concentration of 35% by mass) of a methacrylic acid-based copolymer having a tertiary amino group as a polar group in a side chain (Ac) (having no melting point, weight average molecular weight Mw: 40,000). The obtained methacrylic acid-based copolymer was bound to a proton in the aqueous solution and bound to an acetate ion as a cation, and thus it was confirmed that the polar group was a cationic group.

Example 1-1

As a material for the substrate layer, 100 parts by mass of a propylene homopolymer (MA) (trade name: NOVATEC PP MA4, manufactured by Japan Polypropylene Corporation, melting point (JIS-K7121): 167° C.) was provided. This was melt-kneaded using an extruder heated to 210° C. and supplied to a two-layer coextrusion die.

As materials for the heat sealing layer (A), 50 parts by mass of an ethylene-vinyl acetate copolymer (631) (trade name: Ultrasen 631, manufactured by Tosoh Corporation, ethylene (E) content: 80% by mass, vinyl acetate (VA) content: 20% by mass, melting point: 82° C.), 10 parts by mass of a maleic anhydride-modified polypropylene resin (KE) (trade name: TOYO TAC PMA-KE, manufactured by Toyobo Co., Ltd., melting point 80° C., weight average molecular weight Mw: about 60,000, acid value: 24 mgKOH/g), and 40 parts by mass of a terpene resin (YS) (trade name: YS RESIN PX1000, manufactured by Yasuhara Chemical Co., Ltd., softening point: 100° C.) were provided. These materials were melt-kneaded using an extruder heated to 150° C. and supplied to the above two-layer coextrusion die.

The melt-kneaded substance of the materials was laminated in the two-layer coextrusion die and extruded from the T-die to obtain a laminated body having a two-layer structure of substrate/heat sealing layer (A). The substrate layer side of this laminated body was directed along a metal roll whose temperature was adjusted by cooling water at 40° C. and a Teflon (registered trademark) roll whose temperature was adjusted by cooling water at 35° C. was pressed against the heat sealing layer (A) side at a pressure of 0.2 MPa, conveyed, and cooled to obtain a heat-sensitive label of Example 1.

In the heat-sensitive label of Example 1, the thickness of the substrate layer was 77 µm, and the thickness of the heat sealing layer (A) was 2.5 µm. In addition, the product MCh of the acid value M and the content Ch (% by mass) of the carboxylic anhydride-modified polyolefin resin (maleic anhydride-modified polypropylene resin (KE)) used for the heat sealing layer (A) of the heat-sensitive label was calculated and found to be 240.

Example 1-2 and Comparative Examples 1-1 and 1-2

Heat-sensitive labels of Examples 1-2 and Comparative Examples 1-1 and 1-2 were produced in the same manner as in Example 1 except that the composition of the heat sealing layer (A) in Example 1 was changed as shown in Table 2.

Example 1-3

A heat-sensitive label of Example 1-3 was produced in the same manner as in Example 1 except that 50 parts by mass of an ethylene-glycidyl methacrylate-vinyl acetate copolymer (BF) (trade name: Bondfast BF-2B, manufactured by Sumitomo Chemical Company, Limited, ethylene (E) content: 83% by mass, glycidyl methacrylate (GMA) content: 12% by mass, vinyl acetate (VA) content: 5% by mass, melting point: 95° C.) was used instead of the ethylene-vinyl acetate copolymer (631) of the heat sealing layer (A) in Example 1.

Comparative Example 1-3

A heat-sensitive label of Comparative Example 1-3 was produced in the same manner as in Example 1 except that the maleic anhydride-modified polypropylene resin (KE) was not used for the heat sealing layer (A) and the amount of the terpene resin (YS) was changed to 50 parts by mass in Example 1.

Example 2-1

As a material for the substrate layer, 100 parts by mass of a propylene homopolymer (MA) (trade name: NOVATEC PP MA4, manufactured by Japan Polypropylene Corporation, melting point (JIS-K7121): 167° C.) was provided. This was melt-kneaded in an extruder heated to 210° C. and supplied to a two-layer coextrusion die.

In addition, as a material for the layer (B2), 100 parts by mass of a metallocene-based low density polyethylene (KS), which is a linear low density polyethylene, (trade name: KERNEL KS571, manufactured by Japan Polyethylene Corporation, MFR: 12 g/10 min, melting point: 100° C., density: 0.907 g/cm$^3$) was provided. This was melted using an extruder heated to 210° C. and supplied to the same two-layer coextrusion die as for the substrate layer.

The material for the substrate layer and the material for the layer (B2) were laminated in the two-layer coextrusion die and extruded from the die as a sheet having a two-layer structure. This was cooled by a cooling apparatus to obtain an unstretched sheet having a two-layer structure.

The obtained unstretched sheet was heated to 150° C. and stretched 5 times in the longitudinal direction by utilizing the difference in peripheral speed of a plurality of roll groups. The sheet was cooled to 60° C. and then heated to 150° C. again and stretched 8 times in the transverse direction using a tenter. Next, the sheet was annealed at 160° C. and cooled to 60° C. to obtain a transparent biaxially stretched film having a two-layer structure.

After slitting an edge portion of the biaxially stretched film, the film was guided to a corona discharge treatment apparatus, and both the surfaces on the substrate layer side and the surface on the layer (B2) side were subjected to corona discharge treatment at 50 W/m$^2$.

The total thickness of the obtained biaxially stretched film was 70 µm. In addition, in the above film, the thickness of the substrate layer was 68 µm, and the thickness of the layer (B2) was 2 µm.

Next, the methacrylic acid-based copolymer (Ac) having a polar group obtained in Preparation Example 1 as a tackifier, an ethylene-methacrylic acid copolymer (EMAA) (trade name: NUCREL N035C, manufactured by Dow-Mitsui Polychemicals Co., Ltd., melting point: 86° C.) as a heat sealing resin, and an isobutylene-maleic anhydride copolymer (ISO) (trade name: ISOBAM 04, manufactured by Kuraray Co., Ltd., melting point: none, weight average molecular weight Mw: about 60,000, acid value: 726 mgKOH/g) as a carboxylic anhydride-modified polyolefin resin were diluted with ion exchanged water to prepare a coating liquid. The solid concentration of the methacrylic acid-based copolymer (Ac) in the coating liquid was adjusted to 1.1% by mass, the solid concentration of the ethylene-methacrylic acid copolymer (EMAA) was adjusted to 34.3% by mass, and the solid concentration of the isobutylene-maleic anhydride copolymer (ISO) was adjusted to 64.6% by mass. The prepared coating liquid was applied onto the surface of the biaxially stretched film on the layer (B2) side using a gravure coater. The applied coating liquid was dried in an oven at 80° C. to form the layer (B1) to obtain a heat-sensitive label of Example 2-1.

The thickness of the layer (B1) of the heat-sensitive label of Example 2-1 was 0.05 g/m² (0.05 μm). The product MCs of the acid value M and the content Cs (% by mass) of the carboxylic anhydride-modified polyolefin resin (isobutylene-maleic anhydride copolymer (ISO)) used for the layer (B1) was calculated and found to be 46900.

Example 2-2 and Comparative Example 2-1

Heat-sensitive labels of Examples 2-2 and Comparative Example 2-1 were produced in the same manner as in Example 2-1 except that the composition of the layer (B1) in Example 2-1 was changed as shown in Table 2.

Various physical properties of the above heat-sensitive labels were measured as follows.
<Acid Value>
The acid value M (mgKOH/g) of the carboxylic anhydride-modified polyolefin resin was measured according to JIS 0070.
<Thickness>
The thickness (total thickness) of the heat-sensitive label was measured using a constant pressure thickness gauge (product name: PG-01J, manufactured by TECLOCK Co., Ltd.) according to JIS K7130:1999. In addition, the thickness of each layer in the heat-sensitive label was determined as follows. A sample to be measured was cooled to a temperature of -60° C. or less using liquid nitrogen, and a razor blade (product name: Proline Blade, manufactured by Schick Japan K.K.) was applied at a right angle to the sample placed on a glass plate to cut the sample to prepare a sample for cross-sectional observation. A cross section of the obtained sample was observed using a scanning electron microscope (product name: JSM-6490, manufactured by JEOL Ltd.), and a boundary line for each thermoplastic resin composition of the layers was discriminated from the appearance and the measured value of the total thickness of the heat-sensitive label was multiplied by the thickness ratio of each layer observed to determine the thickness of each layer.
(Evaluation)
Labeled containers were produced using the heat-sensitive labels of each Example and Comparative Example as follows, and the adhesive strength and the recyclability of each heat-sensitive label were evaluated.
<Production of Labeled Containers>
The heat-sensitive label was cut into a sheet-like shape immediately after the preparation thereof and punched into a rectangle having a long side of 8 cm and a short side of 6 cm to prepare a sample for evaluation.

The sample was charged using an electrostatic charging apparatus, disposed inside a molding mold of a stretch blow molding machine (manufactured by NISSEI ASB Machine Co., Ltd., machine name: ASB-70DPH), and clamped. The disposition was carried out such that the substrate layer was in contact with the mold. The heat-sensitive label was disposed in the mold such that the long side of the label was parallel to the circumferential direction of the body of a resin container in the form of a quadratic prism. The mold was controlled such that the surface temperature on the cavity side was within the range of 20 to 45° C.

On the other hand, a preform of a polyethylene terephthalate resin was preheated to 100° C. This preform was guided to the mold and stretch blow molded for 1 second under a blow pressure of 5 to 40 kg/cm². After cooling to 50° C. in 15 seconds, the mold was opened to obtain a PET container with a heat-sensitive label having a square body having a height of 12 cm and a side length of about 7 cm.
<Adhesive Strength>
The obtained labeled PET container was stored for 2 days in an environment of a temperature of 23° C. and a relative humidity of 50%. Next, the label and the container main body at the portion of the labeled PET container where the label was provided were integrally cut off using a cutter, and a sample having a length of 12 cm with the circumferential direction of the container body as the longitudinal direction (the label-attached portion measuring 8 cm, the label-unattached portion measuring 4 cm) and a width of 1.5 cm (the label was attached to the entire width) was collected.

The label-attached portion of the obtained sample was carefully peeled off from the label-unattached portion thereof and peeled off by about 1 cm to form a grip margin. Next, the grip margin and a PET film (thickness of 50 μm) having a width of 1.5 cm were overlapped and adhered using an adhesive to form a grip margin portion on the label side to prepare a sample for measuring the adhesive strength.

A 180-degree peeling test of the container body and the label was carried out under a condition of a peeling speed of 300 mm/min using a tensile tester (manufactured by Shimadzu Corporation, model name: Autograph AGS-5kNJ) based on JIS K6854-2:1999. The average value of the peeling forces between peeling lengths of 25 to 75 mm was measured, and further, the value obtained by averaging the measured values at 6 points of the sample was taken as the adhesive strength. The unit of adhesive strength was gf/15 mm. An adhesive strength of 200 gf/15 mm or more can be considered to be a practical level.
<Recyclability>
100 8 mm×8 mm samples were cut out from the label-attached portion of the labeled PET container after storage thus obtained. The obtained samples were immersed in a 1.5% NaOH aqueous solution at 90° C. for 15 minutes and stirred at a stirring speed of 1000 rpm, and then the samples were taken out. The recyclability was evaluated from the number of samples from which the label was peeled off as follows.

A: In 95 or more of the 100 samples, the label was peeled off (practical level)

B: In 90 or more and 94 or less of the 100 samples, the label was peeled off (practical level)

C: In 89 or less of the 100 samples, the label was peeled off (impractical level)

Tables 2 and 3 below show the composition and evaluation results of each heat-sensitive label.

TABLE 2

| | Substrate layer Thermoplastic resin | Heat sealing layer (A) | | | | | | | |
|---|---|---|---|---|---|---|---|---|---|
| | | HS resin | | | Acid-modified PO | Tackifier | | | |
| | MA [% by mass] | 631 [% by mass] | BF [% by mass] | KS [% by mass] | KE [% by mass] | YS [% by mass] | MCh | Adhesive strength [gf/15 mm] | Recyclability |
| Example 1-1 | 100 | 50 | — | — | 10 | 40 | 240 | 560 | A |
| Example 1-2 | 100 | 50 | — | — | 20 | 30 | 500 | 250 | A |
| Example 1-3 | 100 | — | 50 | — | 10 | 40 | 240 | 680 | A |
| Comparative Example 1-1 | 100 | 50 | — | — | 5 | 45 | 120 | 800 | C |
| Comparative Example 1-2 | 100 | 50 | — | — | 30 | 20 | 720 | 100 | Unevaluable |
| Comparative Example 1-3 | 100 | 50 | — | — | — | 50 | 0.0 | 800 | C |

TABLE 3

| | Substrate layer | Heat sealing layer (B) | | | | | | | | |
|---|---|---|---|---|---|---|---|---|---|---|
| | | Layer (B2) HS resin | | | Layer (B1) | | | | | |
| | | | | | Acid-modified PO ISO | | | Tackifier | | |
| | Thermoplastic resin | | | | | | | | | |
| | MA [% by mass] | 631 [% by mass] | BF [% by mass] | KS [% by mass] | Content in HS layer (B) [% by mass] | Content in layer (B1) [% by mass] | HS resin EMAA | Ac [% by mass] | MCs | Adhesive strength [gf/15 mm] | Recyclability |
| Example 2-1 | 100 | — | — | 100 | 1.6 | 64.6 | 34.3 | 1.1 | 46900 | 530 | A |
| Example 2-2 | 100 | — | — | 100 | 2.0 | 80.0 | 19.4 | 0.6 | 58000 | 300 | A |
| Comparative Example 2-1 | 100 | — | — | 100 | 0.8 | 32.3 | 65.3 | 2.0 | 23400 | 680 | C |

As is shown in Tables 2 and 3, the heat-sensitive labels of Examples 1-1 to 1-3, 2-1, and 2-2 can all achieve both sufficient adhesive strength and excellent recyclability. On the other hand, the heat-sensitive labels of Comparative Examples 1-1, 1-3, and 2-1 have high adhesive strength but low recyclability. In Comparative Example 1-2, the adhesive strength was weak and the recyclability was unable to be evaluated.

The present application claims priority based on Japanese Patent Application No. 2020-58941 filed on Mar. 27, 2020, the disclosure of which is incorporated herein by reference in its entirety.

REFERENCE SIGNS LIST 10a, 10b . . . heat-sensitive label, 1 . . . substrate layer, 2a . . . heat sealing layer (A), 2b . . . heat sealing layer (B), 21 . . . layer (B1), and 22 . . . layer (B2)

The invention claimed is:

1. A heat-sensitive label comprising a substrate layer and a heat sealing layer (A) on the substrate layer, wherein
the heat sealing layer (A) comprises a heat sealing resin and a carboxylic anhydride-modified polyolefin resin (h);
wherein the heat sealing layer comprises an olefin-based resin; and
a product MCh of an acid value M (mgKOH/g) of the carboxylic anhydride-modified polyolefin resin (h) and a content Ch (% by mass) of the carboxylic anhydride-modified polyolefin resin (h) in the heat sealing layer (A) is 150 to 600.

2. The heat-sensitive label according to claim 1, wherein the heat sealing resin has a melting point of 60 to 115° C.

3. The heat-sensitive label according to claim 1, wherein the heat sealing layer (A) comprises a tackifier.

4. The heat-sensitive label according to claim 1, wherein the heat sealing resin is a resin having an epoxy group or an acetoxy group.

5. The heat-sensitive label according to claim 1, wherein the carboxylic anhydride-modified polyolefin resin (h) has a melting point of 60 to 140° C.

6. The heat-sensitive label according to claim 1, wherein a weight average molecular weight of the carboxylic anhydride-modified polyolefin resin (h) is 10,000 to 400,000.

7. A heat-sensitive label comprising a substrate layer and a heat sealing layer (B) on the substrate layer, wherein
the heat sealing layer (B) comprises a layer (B1) constituting an outermost surface of the heat sealing layer (B), and a layer (B2) provided on a side closer to the substrate layer than the layer (B1);
the layer (B2) comprises a heat sealing resin and does not comprise a carboxylic anhydride-modified polyolefin resin;
the layer (B1) comprises a heat sealing resin and a carboxylic anhydride-modified polyolefin resin (s);
a product MCs of an acid value M (mgKOH/g) of the carboxylic anhydride-modified polyolefin resin (s) and a content Cs (% by mass) of the carboxylic anhydride-modified polyolefin resin (s) in the layer (B1) is 25000 to 90000; and the heat sealing resins included in the layer (B1) and the layer (B2) are the same or different.

8. The heat-sensitive label according to claim 7, wherein the heat sealing resins each have a melting point of 60 to 115° C.

9. The heat-sensitive label according to claim 7, wherein the layer (B1) comprises a tackifier.

10. The heat-sensitive label according to claim 7, wherein the heat sealing resins are each a low density polyethylene or an ethylene-methacrylic acid copolymer.

11. The heat-sensitive label according to claim 7, wherein a thickness of the layer (B1) is 0.5 to 5.0% of a total thickness of the layers (B1) and (B2).

12. The heat-sensitive label according to claim 7, wherein a weight average molecular weight of the carboxylic anhydride-modified polyolefin resin (s) is 10,000 to 400,000.

13. The heat-sensitive label according to claim 1, wherein a specific gravity of the substrate layer is 1.0 or less.

14. The heat-sensitive label according to claim 1, wherein the heat-sensitive label is a label for a molded body of a polyester resin.

15. The heat-sensitive label according to claim 7, wherein a specific gravity of the substrate layer is 1.0 or less.

16. The heat-sensitive label according to claim 7, wherein the heat-sensitive label is a label for a molded body of a polyester resin.

17. The heat-sensitive label according to claim 1, wherein the olefin-based resin includes a homopolymer and a copolymer formed from an olefin and another comonomer; and the comonomer is at least one selected from the group comprising of vinyl acetate, acrylic acid, methacrylic acid, an acrylic acid alkyl ester, a methacrylic acid alkyl ester, glycidyl acrylate, and glycidyl methacrylate.

18. The heat-sensitive label according to claim 1, wherein the weight average molecular weight Mw of the carboxylic anhydride-modified polyolefin resin (h) included in the heat sealing layer (A) is 40,000 to 400,000.

* * * * *